UNITED STATES PATENT OFFICE.

PAUL JULIUS, OF LUDWIGSHAFEN, GERMANY, ASSIGNOR TO BADISCHE ANILIN & SODA FABRIK, OF LUDWIGSHAFEN, GERMANY, A CORPORATION OF BADEN.

RED CARBON DYE LAKE.

SPECIFICATION forming part of Letters Patent No. 690,294, dated December 31, 1901.

Application filed August 18, 1900. Serial No. 27,329. (No specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria and Empire of Germany, have invented a new Red Carbon Dye Lake, of which the following is a specification.

This invention relates to the manufacture of coloring-matter lakes from certain monoazo dyestuffs which can be derived from a diazotized heteronuclear monosulfo-acid of beta-naphthylamin and a suitable component. It has been found that of these azo dyestuffs those which contain beta-naphthol as a component are in particular suited to the production of lakes containing calcium, barium, aluminium, lead, zinc, &c., or several of these metals. These lakes are applicable in the arts for use in the manufacture of lithographic and of printing inks, for the production of oil-paints, colored paper, &c. These beta-naphthol azo dyes all have in common the property of yielding lakes containing calcium, which in addition to being insoluble in water are likewise quite fast to ordinary acids and to light, and it is this combination of properties which distinguishes these lakes and promises to make them desirable and useful in the arts.

My invention relates to those coloring-matter lakes which contain one or more of the following mono-azo dyestuffs: (a) 2-naphthylamin-5-sulfo-acid-azo-beta-naphthol, (b) 2-naphthylamin-8-sulfo-acid-azo-beta-naphthol, (c) 2-naphthylamin-7-sulfo-acid-azo-beta-naphthol, (d) 2-naphthylamin-6-sulfo-acid-azo-beta-naphthol, and of these lakes more particularly those lakes which contain calcium.

Of the above-named dyestuffs all but the one from diazotized 2-naphthylamin-7-sulfo-acid and beta-naphthol have been described in the literature. This new dyestuff can, however, be prepared in accordance with the ordinary rules of the art for producing such bodies; but the dyestuff itself is not claimed in this application.

The sodium salts of all the above-named dyestuffs are capable of yielding coloring-matter lakes if they be suspended in water and treated with water-soluble salts of the metal whose lake is to be produced. Lakes can also be produced by treating the free acid of the above-named azo dyestuffs in aqueous suspension with the oxid, hydrate, or carbonate of the metal whose lake is to be formed. In some cases even, if desired, the chlorid or acetate of the metal can be employed. The coloring-matter lakes so obtained all possess a red color. The shade obtained with any given dyestuff is in general quite independent of the metal contained in the lake. In the case of the dyestuff (b) of the above list, however, the lake containing calcium is of a deep bordeaux shade instead of the more scarlet shade of the other lakes of the same dyestuff.

In the following examples I further illustrate the nature of this my invention and show how it can be carried into practical effect, without, however, wishing to be understood as limiting myself to the proportion or materials there given. The parts are by weight.

*Example 1.—Production of a Lake Suitable for Lithographic Purposes.*

(a) *By means of the sodium salt of the dyestuff.*—One and one-tenth (1.1) parts of the sodium salt of the dyestuff 2-naphthylamin-8-sulfo-acid-azo-beta-naphthol are made into a paste with one hundred (100) parts of water. To this add a solution of one (1) part of crystallized barium chlorid in ten (10) parts of water, bring to a boil and boil for from three (3) to five (5) minutes, add one hundred (100) parts of a two and one-half (2.5) per cent. paste of alumina hydrate, filter, wash, and dry.

(b) *By means of the free dyestuff acid.*— To one (1) part of the dyestuff acid in the form of paste add one hundred (100) parts of water and one (1) part of crystallized barium chlorid dissolved in ten (10) parts of water, bring to a boil and boil for from three (3) to five (5) minutes, add one hundred (100) parts of a two and one-half (2.5) per cent. paste of alumina hydrate, filter, wash, and dry.

(c) *Production of a lake carrying a substratum.*—Bring a mixture consisting of five (5) parts of the dyestuff acid in the form of paste, three hundred (300) parts of water, and five (5) parts of calcined Glauber salt to boil, and into this boiling mixture slowly introduce a solution of thirteen and two-tenths (13.2) parts of crystallized barium chlorid in one hundred and thirty-two (132) parts of water, filter, wash, and dry.

*Example 2—Production of a Lake Suitable for Use in the Manufacture of Colored Paper.*

To a solution of ten (10) parts of sulfate of alumina dissolved in one hundred (100) parts of water add an amount of milk of lime corresponding to two and fifty-three one-hundredths (2.53) parts of caustic lime (CaO) and then two (2) parts of the dyestuff acid made into a paste with a small amount of water, bring to a boil and boil for from three (3) to five (5) minutes, filter, wash, and dry.

In the above examples I can substitute other alkali salts of the dyestuff acid for the sodium salt employed. I can also substitute the other coloring-matters either in the form of salts or free acid for the sodium or other salt or the free acid of the coloring-matter hereinbefore employed. Similarly lakes containing other metals can be made by making suitable changes in the metallic salts employed.

All of my new lakes are characterized by containing a mono-azo dyestuff which can be derived from a diazotized heteronuclear monosulfo-acid of beta-naphthylamin and beta-naphthol. On suitable treatment with a reducing agent, such as stannous chlorid, these dyestuffs are decomposed into the corresponding heteronuclear monosulfo-acid of beta-naphthylamin on the one hand and alpha-amido-beta-naphthol on the other hand. These bodies can then be separated by the well-known methods usual in such operations, and they can then be identified by any of the known and suitable means.

What I claim is—

1. As a new article of manufacture the coloring-matter lake which contains a mono-azo dyestuff which can be derived from a diazotized heteronuclear monosulfo-acid of beta-naphthylamin and beta-naphthol, which lake on suitable treatment with a reducing agent yields a heteronuclear monosulfo-acid of beta-naphthylamin and alpha-amido-beta-naphthol.

2. As a new article of manufacture the coloring-matter lake which contains calcium and a mono-azo dyestuff which can be derived from diazotized 2-naphthylamin-8-sulfo-acid and beta-naphthol, which lake on suitable treatment with a reducing agent yields 2-naphthylamin-8-sulfo-acid and alpha-amido-beta-naphthol.

In testimony whereof I have hereunto set my hand in the presence of two subscribing witnesses.

PAUL JULIUS.

Witnesses:
 BERNHARD C. HESSE,
 LEOPOLD HEINRICH DEHOFF.